(12) United States Patent
Sawicki et al.

(10) Patent No.: US 11,731,064 B1
(45) Date of Patent: Aug. 22, 2023

(54) FLUID FILTER DEVICE AND PROCESS

(71) Applicant: Ansa Technologies, Pompano Beach, FL (US)

(72) Inventors: Waldemar S Sawicki, Coconut Creek, FL (US); David Tristan Antelo, Boca Raton, FL (US)

(73) Assignee: Hydrevolve Inc., Pompano Beach, FL (US)

( * ) Notice: Subject to any disclaimer, the term of this patent is extended or adjusted under 35 U.S.C. 154(b) by 0 days.

(21) Appl. No.: 17/840,594

(22) Filed: Jun. 14, 2022

(51) Int. Cl.
*B01D 29/35* (2006.01)
*B01D 35/30* (2006.01)

(52) U.S. Cl.
CPC .............. *B01D 29/35* (2013.01); *B01D 35/30* (2013.01)

(58) Field of Classification Search
USPC ................. 210/445, 446, 448, 451, 452, 453
See application file for complete search history.

(56) References Cited

U.S. PATENT DOCUMENTS

| | | | | |
|---|---|---|---|---|
| 5,490,868 A | * | 2/1996 | Whitlock | B01D 29/114 55/504 |
| 2005/0145551 A1 | * | 7/2005 | Ballet | B01D 29/117 210/175 |
| 2020/0101406 A1 | * | 4/2020 | Kumagai | B29C 66/542 |

* cited by examiner

*Primary Examiner* — Benjamin M Kurtz
(74) *Attorney, Agent, or Firm* — Steven C. Stewart

(57) ABSTRACT

A fluid filter device and method are disclosed. The fluid filter device includes a first disk having an opening forming an inlet and a second disk having an opening forming an outlet. A cylindrically shaped soft housing is disposed adjacent the first disk at one end and engaging with the second disk at its other end. A first cylindrical shaped permeable bag filter is encased by the soft housing. The bag filter has a closed end disposed adjacent the outlet, and the bag filter has an open end coupling with the first disk to form a seal around the inlet such that liquid entering the inlet permeates through the bag filter to a region between the bag filter and the soft housing before exiting the outlet.

9 Claims, 8 Drawing Sheets

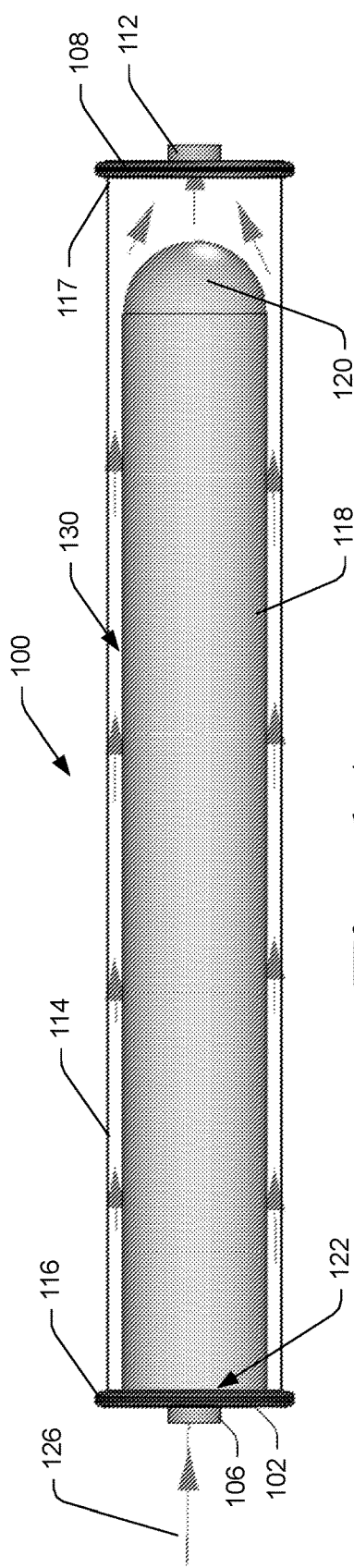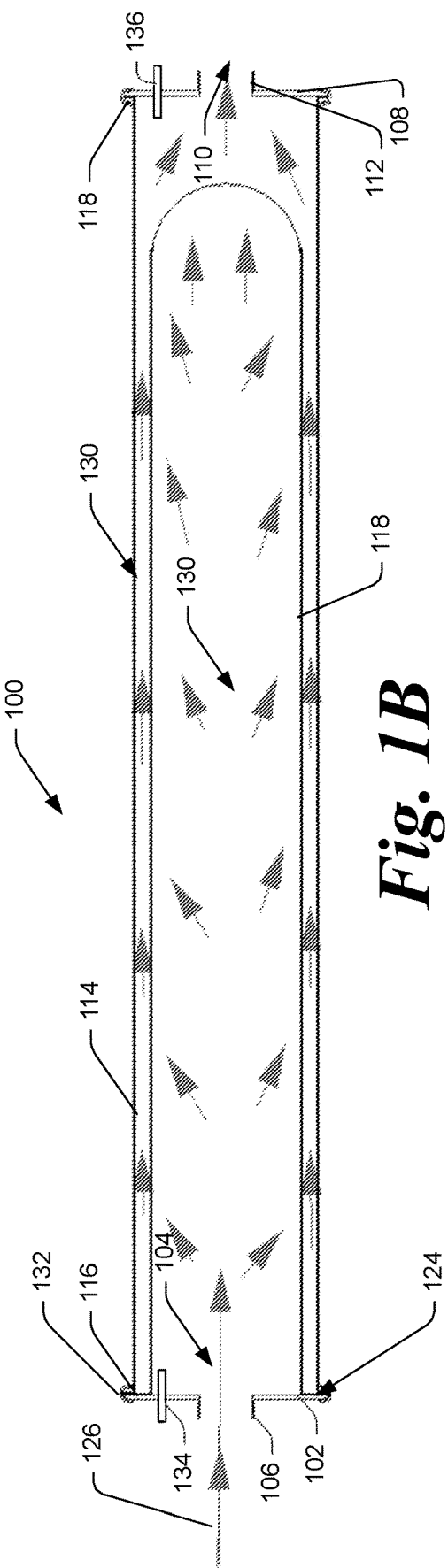
Fig. 1A
Fig. 1B

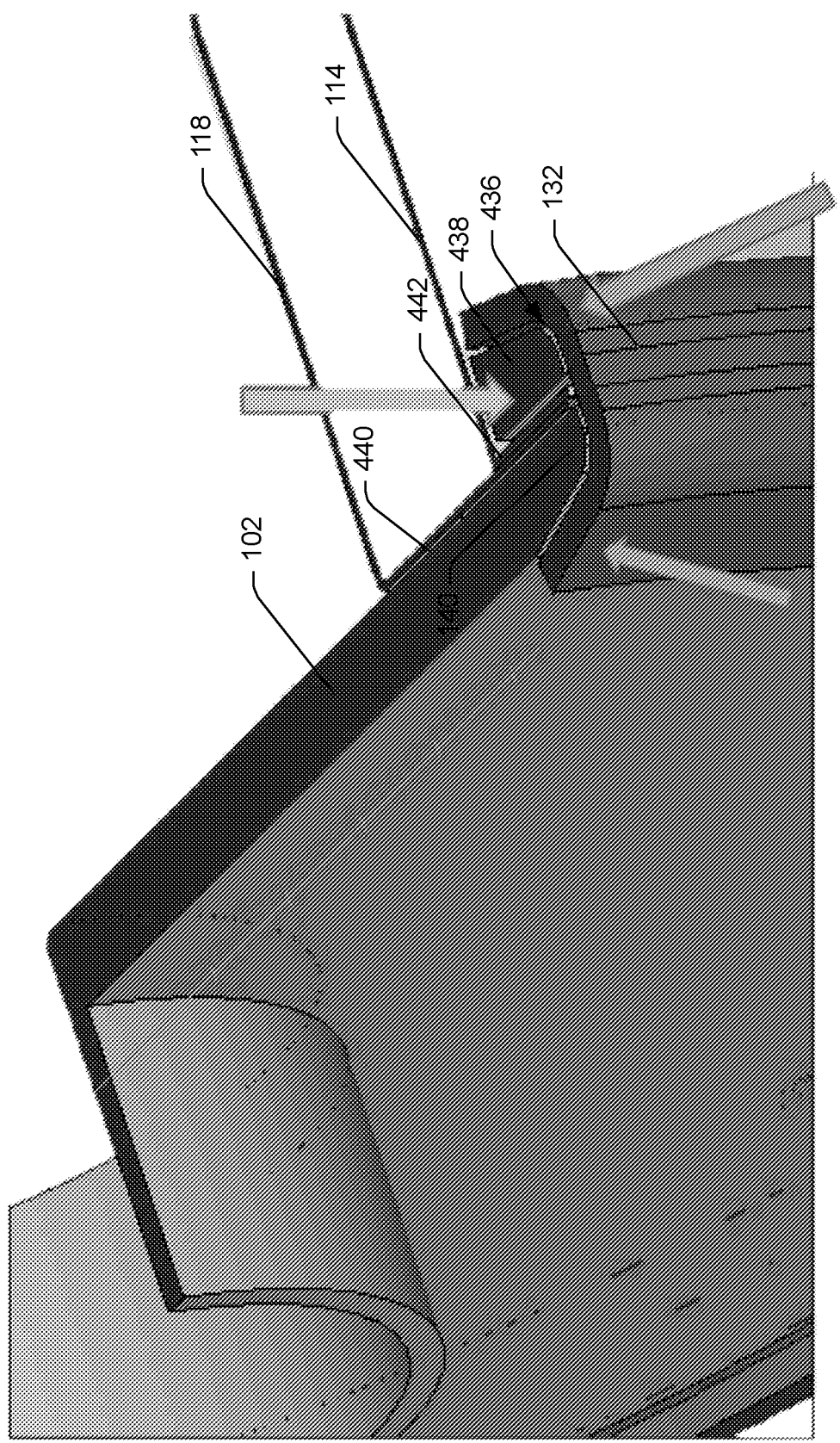

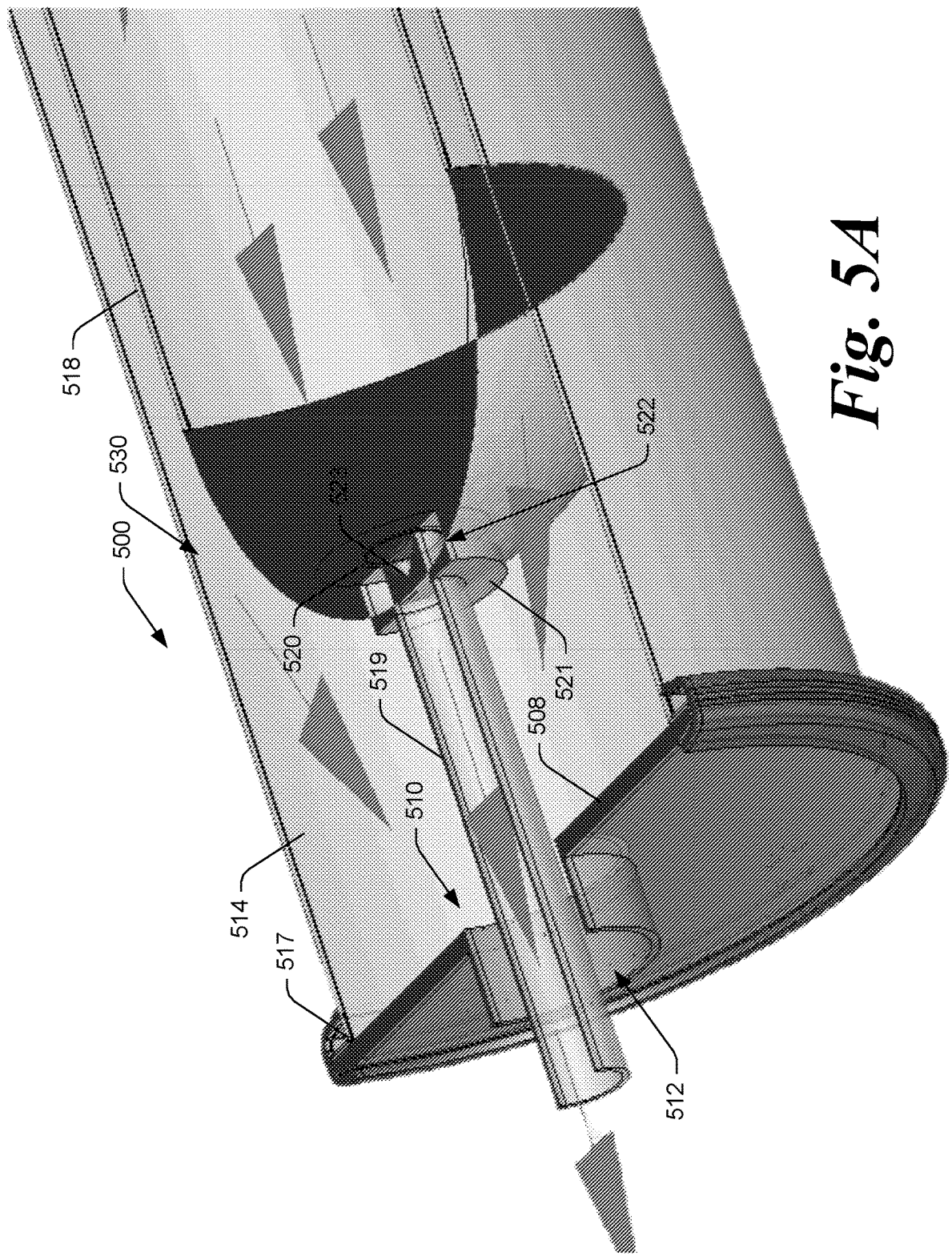

FLUID FILTER DEVICE AND PROCESS

TECHNICAL FIELD

These claimed embodiments relate to a method and apparatus for filtering fluid and more particularly to a soft filter device that filters fluid that can be collapsed and expanded.

BACKGROUND OF THE INVENTION

A method and apparatus for filtering fluid is disclosed.

Most water filtration devices currently used consist of filtration media, a cartridge, or some other form of permeable material. These devices are usually inside some rigid housing which can vary in construction material. The purpose of a rigid housing is to protect the filtration media and/or to counteract the contraction or expansion forces of water pressure on the media or cartridge. Most water filtration equipment is stationary and is meant to stay in one location, and most often their footprint is not critical. In recent years, transportability has become more important, giving way to the replacement of hard-plumbed tubing (PVC, metal) by flexible hoses that can be rolled and easily transported. Filtration housings however have not changed, they are still made of rigid materials which are susceptible to breakage during transport, and can be awkward when logistical space is limited.

SUMMARY OF THE INVENTION

In one implementation a fluid filter device is disclosed that has a first disk having an opening forming an inlet and a second disk having an opening forming an outlet. A cylindrically shaped soft housing is disposed adjacent the first disk at one end and engaging with the second disk at its other end. A first cylindrical shaped permeable bag filter is encased by the soft housing. The bag filter has a closed end disposed adjacent the outlet. The bag filter has an open end coupling with the first disk to form a seal around the inlet such that liquid entering the inlet permeates through the bag filter to a region between the bag filter and the soft housing before exiting the outlet.

In another implementation, a method for filtering fluid with a soft housing is disclosed. The soft housing includes an inlet end with an inlet and an outlet end with an outlet, the soft housing encasing a permeable bag filter. The bag filter has a closed end disposed adjacent the outlet end. The bag filter has an open end forming a seal around the inlet. The method includes uncoiling the soft housing from a coiled configuration to an uncoiled configuration. Fluid may then be injected into permeable bag filter via the inlet. The injected fluid may then be passed through the bag filter to provide filtered fluid in a region between the bag filter and the soft housing. The filtered fluid may then be passed out the outlet.

In another implementation, a method for filtering fluid is disclosed. The method includes providing a soft housing having an inlet end with an inlet, and an outlet end with an outlet. A permeable bag filter is encased with the soft housing with the bag filter having a closed end located adjacent the outlet end, and the bag filter having an open end adjacent the inlet. A disk device is provided having an aperture to form the inlet. The disk device engages with the bag filter to form a seal around the aperture, and a seal is formed on the soft housing and on the disk device around the bag device.

BRIEF DESCRIPTION OF THE DRAWINGS

The detailed description is described with reference to the accompanying figures. In the figures, the left-most digit(s) of a reference number identifies the figure in which the reference number first appears. The use of the same reference number in different figures indicates similar or identical items.

FIGS. 1A and 1B are cross sectional views of a liquid filter device;

FIG. 4 is a cross sectional views of the liquid filter device shown in FIGS. 1A, 1B and 2 showing a filter sleeve;

FIGS. 5A and 5B are cross sectional views of an alternate embodiment of the liquid filter device shown in FIGS. 1A, and 1B;

DETAILED DESCRIPTION

Figure 2:
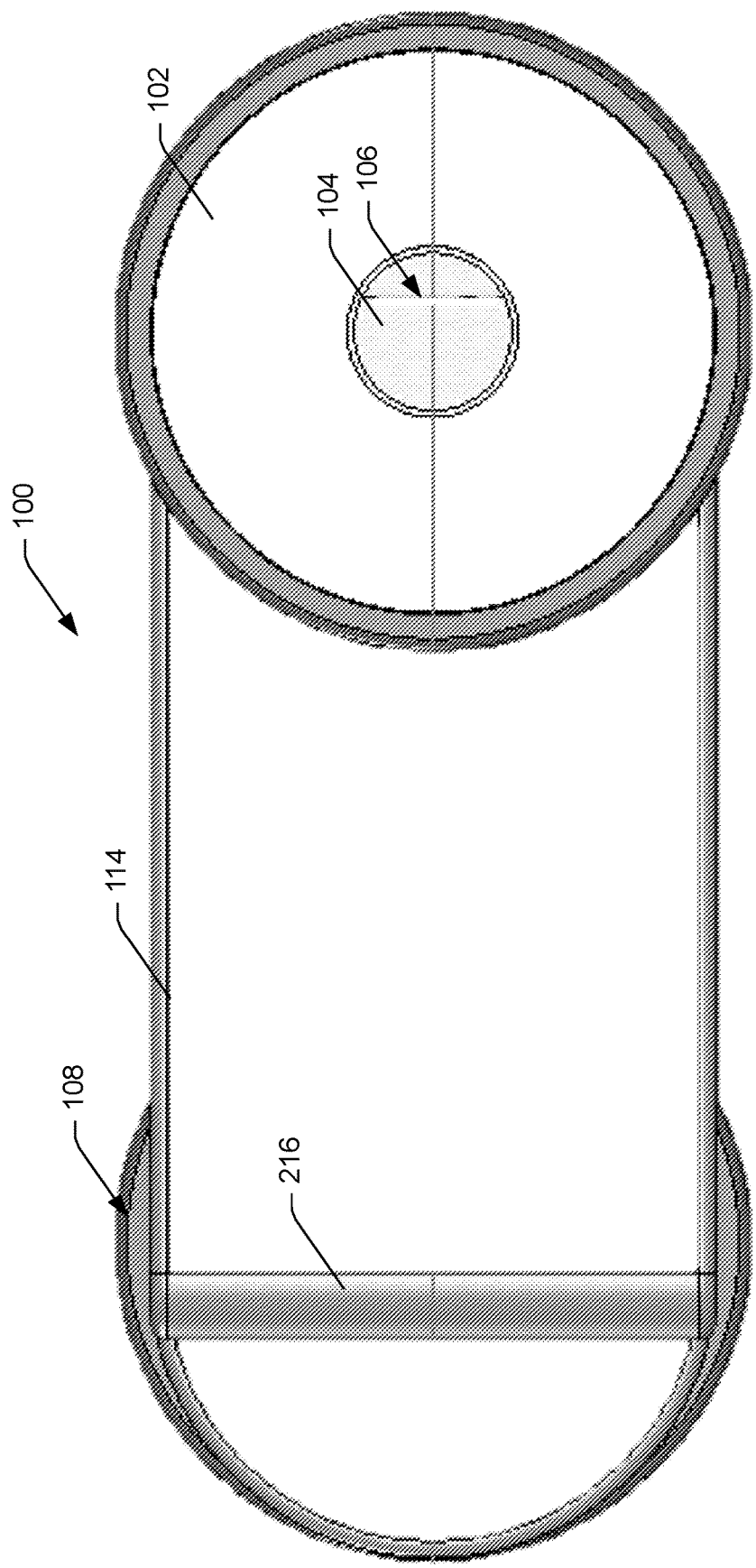
FIG. 2 is a front plan view of the liquid filter device.

Referring to FIGS. 1A and 1B, there is shown a liquid filter device 100 for filtering liquids including water. Filter device 100 includes a first disk 102 having an opening (e.g., an aperture at the center of first disk 102) 104 forming inlet 106 in an expanded configuration. Device 100 includes a second disk 108 having an opening 110 (e.g., an aperture at the center of second disk 108) forming outlet 112. One end 116 of cylindrically shaped soft housing 114 is located adjacent the first disk 102. The other end 117 of soft housing 114 saleably engages with the second disk 108.

A first cylindrical shaped permeable bag filter 118 is encased by the soft housing 114. The bag filter 118 has a closed end 120 located adjacent the outlet 112. The bag filter 118 has an open end 122. The edges of bag filter 118 at the open end are surrounded by a circular ring retaining bracket 132 that the engages with the first disk 102 to form a seal 124 around the bag filter 118 and the soft housing 114 such that any liquid 126 entering the inlet 106 only permeates through the bag filter 118 to a region 130 between the bag filter 118 and the soft housing 114 before exiting outlet 112.

In one implementation soft housing 114 has a thickness between 0.5 mm and 3 mm and can be constructed from nylon, Kevlar, polyester, segmented polyurethane, Nomex, graphene, graphene composites, or any synthetic material that can be contracted, coiled or folded. Bag filter 118 preferably has a thickness between 0.5 mm and 1.5 mm and can be constructed from polyurethane, polymer materials, polysulfone, polypropylene, PVDF polymer, graphene, glass fiber-PTFE-graphene composite, or any synthetic material. Soft housing 114 can be configured to form a collapsed configuration as shown in FIGS. 2, 6A-6B and 7.

In the collapsed configuration, Soft housing 114 (and bag filter 118) forms a flat shape with a flat top and bottom surface with curved edges. In the collapsed configuration soft housing and its internal bag filter 118 can be folded, coiled, or rolled up.

In one implementation a pressure 134 sensor is placed adjacent first disk 102 to sense the pressure of liquid entering the first disk 102. Another pressure sensor 136 may be placed on second disk 108 to sense the pressure of liquid exiting disk 108. The pressure differential between the sensors on the first and second disc can be viewed on the pressure sensors themselves or transmitted to an external device. A specified predetermined pressure differential may indicate of the bag filter 118 needs to be changed or flushed.

Figure 3:
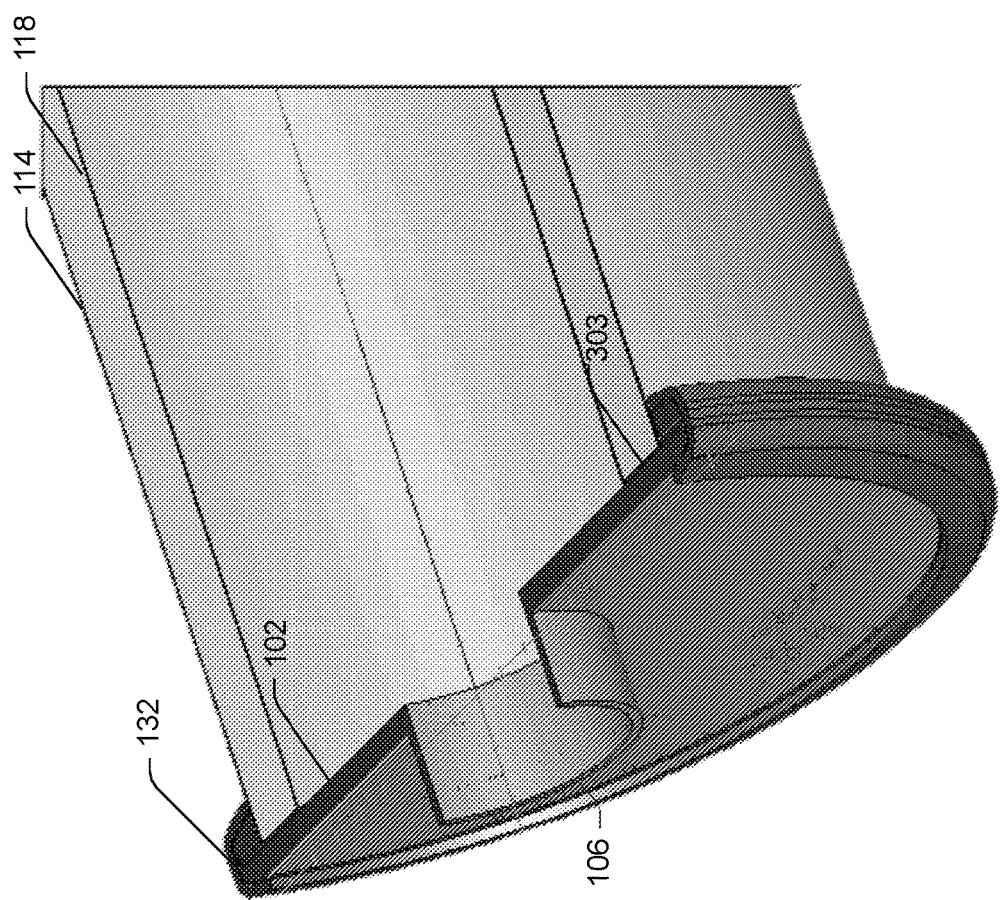
FIG. 3 is a cross sectional views of the liquid filter device shown in FIGS. 1A, and 1B.

Referring to FIGS. 1B, and FIGS. 3-4, circular ring retaining bracket 132 forms a channel 436 (FIG. 4) that surrounds and engages with outside edges of the first disk 102 and edges on one end of the soft housing 114 to compress a protrusion on one end of bag filter 118 between the first disk 102 and the soft housing 114. When ring bracket 132 engages with the first disk 102, a seal 303 (FIG. 3) is formed between the first disk 102, the bag filter 118, and the soft housing 114. Ring bracket 132 can have a hinge mechanism and locking mechanism disposed on opposing sides that tightens channel 436 and creates a seal between bag filter 118 and soft housing 114. Locking mechanism may be unlocked and ring bracket pivoted on hinge mechanism to enable ring bracket 132 to be removed from first disk 102. Once ring bracket 132 is removed, first disk 102 may be released from soft housing 114 and bag filter 118 to allow access and/or removal and/or replacement of bag filter 118.

Referring to FIG. 4, in one implementation, a circular filter sleeve ring 438 wraps around housing 114 (360 degrees) and binds a protrusion 440 on bag filter 118 to ring retaining bracket 132 and sleeve 442 on one end of soft housing 114. Circular filter sleeve ring 438 may be positioned adjacent outside edge 140 of a disk 102 between disk 102 and ring retaining bracket 132.

Figure 7:
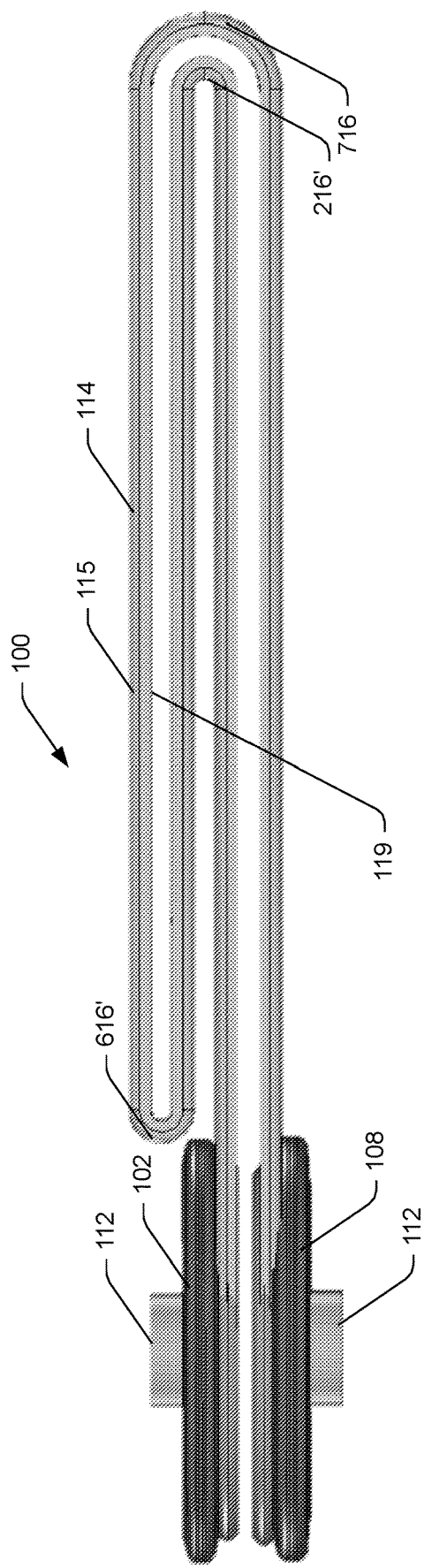
FIG. 7 is a side elevated view of an alternate configuration of the liquid filter device in a collapsed position.

Referring to FIGS. 2, 4, 6A-B and 7, there is shown a water (or fluid) filter device 100 that includes the first disk 102 having an opening 104 forming inlet 106, and a second disk 108 having an opening 110 forming outlet 112 in a closed configuration. A first cylindrical shaped permeable bag filter (not shown) is encased by the soft housing 114. In the closed or folded configuration, bag filter and soft housing 114 has a flat top surface 115 and flat bottom surface 119 with rounded edges. Housing 114 is folded multiple times along folds 216 and 616 (and folds 216', 616', and 716 as shown in FIG. 7) for storage or for easy transportability. Disks 102 and 108 can be oriented at 90 degrees with respect to the soft housing 114 such that the top surface of the disks 102 and 108 lie in a plane parallel to the plane of the top and/or bottom surface of soft housing 114 when filter device 100 is in the closed or folded configuration.

Figure 5B:
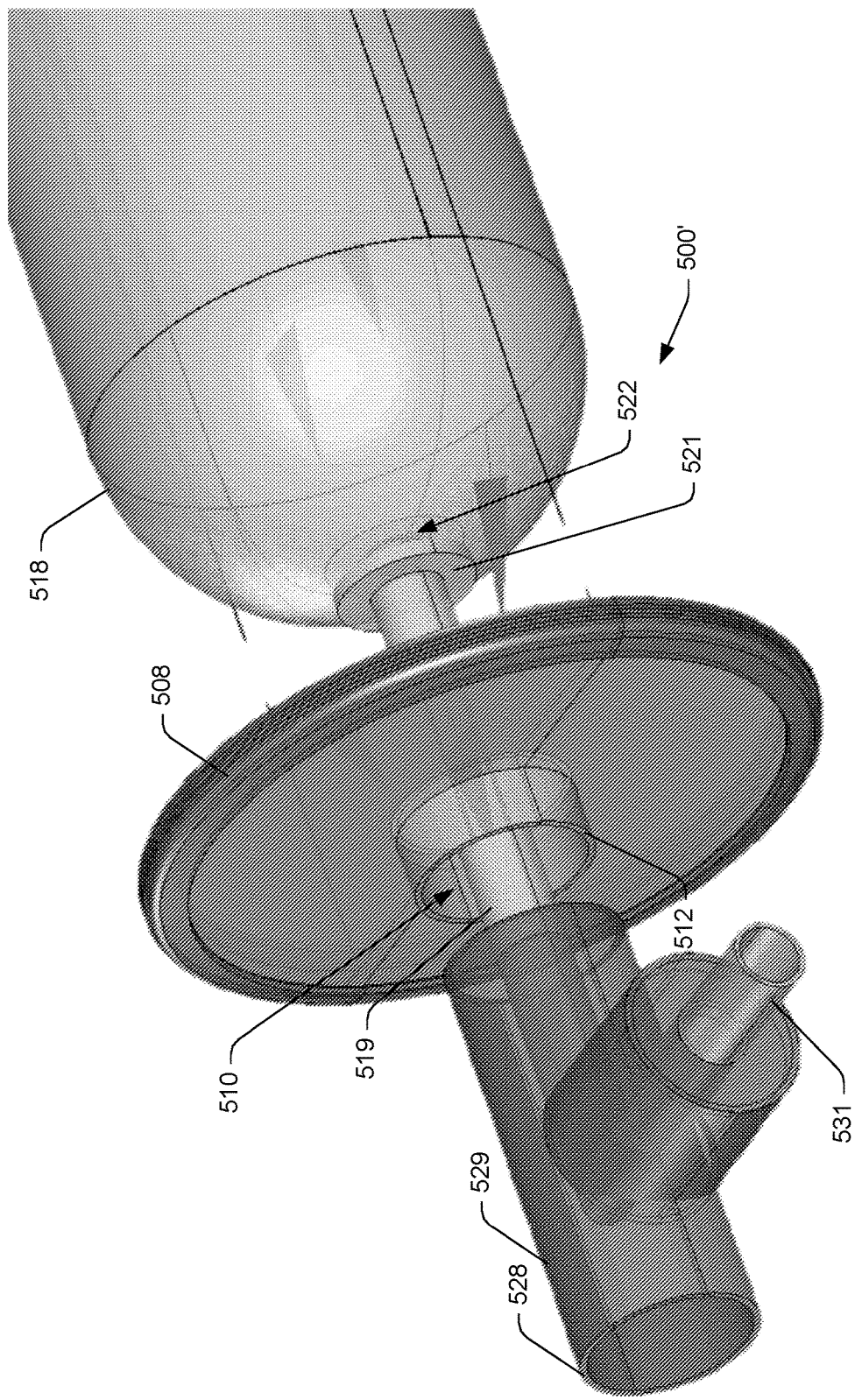
Figure 6A:
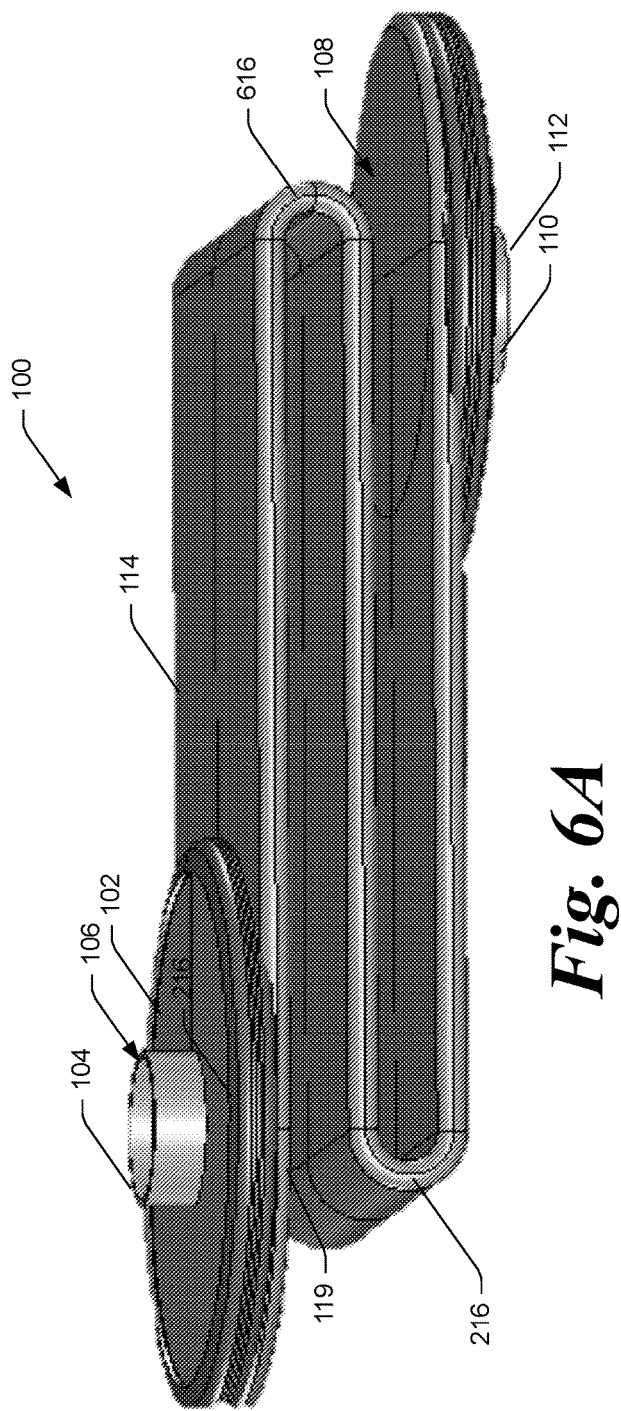
FIG. 6A is a side elevated view and FIG. 6B is a side view of the liquid filter device shown in FIGS. 1A and 1B in a collapsed position.
Figure 6B:
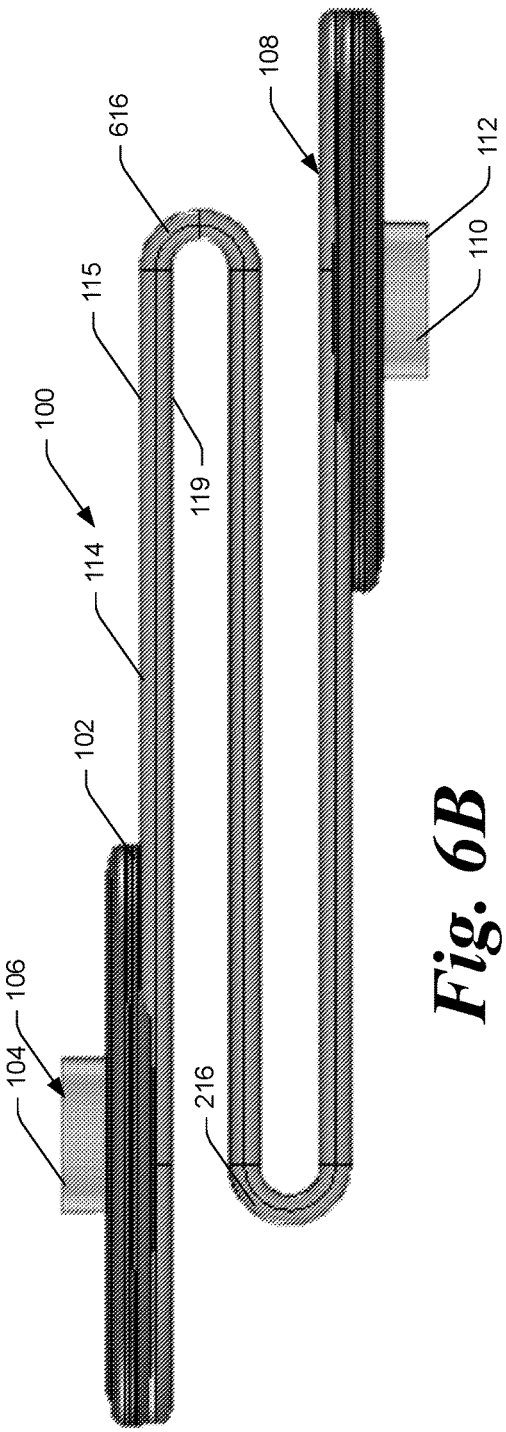

Referring to FIGS. 5A-5B, there is shown cross sectional views of an alternate embodiment of the liquid filter device 500 shown as device 100 in FIGS. 1A, and 1B. The filter device 500 includes a second disk 508 having an opening 510 forming outlet 512. One end of a cylindrically shaped soft housing 514 adjacent a first disk (not shown) is an inlet that. End 517 of cylindrically shaped soft housing 514 sealably engages with the second disk 508.

A first cylindrical shaped permeable bag filter 518 is encased by the soft housing 514 (not shown in FIG. 5B). The bag filter 518 has a partially closed end 520 with an opening through which a portion of fluid under pressure in bag filter 518 may be fed directly through cylindrical hose 519 to the outlet 512. Hose 519 may be permanently connected to bag filter 518. A retaining ring 521 is coupled around the tip 522 of closed end 520 and engages with one end of hose 519 to hold hose 519 on tip 522. In one implementation a manual or automatic opening/closing valve 531 can be placed on hose 519 at its distal end (or alternatively its proximal end) from bag filter 518.

When bag filter 518 needs to be flushed, such as when the pressure detected adjacent the outlet 512 is significantly greater than pressure detected at the inlet, valve 531 can be manually activated by disconnecting a plug (not shown) on a distal end of valve 531 or can be automatically electronically activated using an electronic auto opening valve (not shown) with a controller (not shown) that monitors the pressure adjacent the inlet and the outlet 512. Activating valve 531 to an open position while pressure from the fluid is being applied results in a forward flush of contaminants in bag filter 518. Activating valve 523 to an open position results in the expelling of the trapped contaminants from inside bag filter 518 through hose 519 and outlet 512.

After bag filter 518 is flushed, valve 531 can be manually shut using the plug. Alternatively valve 531 can be automatically electronically actuated to a closed position using the electronically actuated valve.

Hose 519 is preferably made of a soft material. A portion of liquid in bag filter 518 is fed via hose 519 to outlet 512. Additional liquid may enter the inlet and permeate through the bag filter 518 to a region 530 between the bag filter 518 and the soft housing 514 before exiting outlet 512. A space is preferably maintained around hose 519 to enable liquid permeating through bag filter 518 into region 530 (located between the housing 514 and bag filter 518) to be fed through outlet 512.

Filter Operation

Referring to FIG. 1A, during operation fluid is filtered with the soft housing 114 by unfolding the soft housing 114 from a folded configuration (FIG. 2) to an unfolded configuration (See FIGS. 1A, 1B, 5A and 5B). A pump or other fluid pressure inducing device (not shown) may, using a hose (not shown) engageably couple with and seal around the inlet 106, inject fluid under pressure into the permeable bag filter 118 via the inlet 106. The injected fluid may then be passed through the bag filter 118 to provide filtered fluid in a region between the bag filter 118 and the soft housing 114. The filtered fluid may then be pass out of the outlet 112 to another hose (engageably coupled with and sealed around the outlet) for further distribution. After fluid has been discharged from the soft housing 114, the soft housing 114 may be coiled (e.g., folded) from the unfolded configuration (See FIGS. 1A and 1B) to the folded configuration (See FIGS. 2, 6A, 6B and 7).

In one implementation in FIG. 7, unfolding the soft housing 114 from a folded configuration to an unfolded configuration includes unfolding the housing 114 at fold line locations (folds 216', 616' and 716), to the unfolded configuration. In addition, unfolding the housing 114 at the fold line locations to the unfolded configuration may include expanding (uncoiling or unfolding) the soft housing 114 to remove folds 216', 616' and 716. Passing the filtered fluid out the outlet 112 may include passing the filtered fluid to a hose (not shown) that couples with disk 108 formed at outlet 112 of soft housing 114.

In one implementation, debris gather in the bag filter 118 may need to be discharged by backwashing. Specifically, fluid under pressure may be periodically passed through the outlet 112 over the bag filter 118 within the soft housing 114 and out the inlet 106 to remove any debris in the bag filter. Disc 102 would be removed and bag filter 118 would be forced out of housing 114 through opening left by removal of disc 102.

In one implementation, debris gathered in the bag filter 118 may need to be discharged by flushing. Specifically, valve 531 would be changed to an open position and contents of bag filter 118 would be expelled via hose 519 (also referred to as a tube) through value 531 (or an outlet on valve 531).

Referring to FIG. 5B, there is shown an alternate embodiment of the liquid filter device 500' in an unfolded configuration. In this configuration, bag filter 518 (also referred to as soft filter) is coupled with hose 519 that extend through opening 510 in disk 508. Outlet 512 is sealably coupled with input to two directional (e.g. multioutput) pipe 529. Two directional pipe 529 has outlet 528 and outlet 531. Hose 519 extends into the two directional pipe 529, is formed into a right angle or elbow, exits out outlet on valve 531. Outlet on valve 531 is sealed to only allow hose 519 to pass outlet 531. A manual or adjustable valve (not shown) may be coupled to outlet on valve 531. During filter operation, the outlet on valve 531 remains closed and filtered fluid exiting outlet 512 is fed through pipe 529 and exist outlet 528. During a forward flush operation, valve on outlet on valve 531 is opened (manually or in response to a controller) and unfiltered fluid in bag filter 518 is fed out pipe 529 via outlet on valve 531, while simultaneously filtered fluid continues to be fed out outlet 528. The outlet on valve 531 may be closed after the forward flush operation.

While the above detailed description has shown, described and identified several novel features of the invention as applied to a preferred embodiment, it will be understood that various omissions, substitutions and changes in the form and details of the described embodiments may be made by those skilled in the art without departing from the spirit of the invention. Accordingly, the scope of the invention should not be limited to the foregoing discussion but should be defined by the appended claims.

What is claimed is:

1. A liquid filter device comprising:
a first circular disk having a first opening forming an inlet and a second disk having a second opening forming an outlet;
a soft foldable housing removably engaging with the first circular disk at one end of the soft foldable housing and engaging with the second disk at another end of the soft foldable housing; and
a foldable permeable bag filter encased by the soft foldable housing, the foldable permeable bag filter having a closed end terminating adjacent the outlet between the first circular disk and the second disk, the foldable permeable bag filter having an open end removably connecting to the first circular disk, the soft foldable housing and the foldable permeable bag filter engaging along an outside perimeter of the first circular disk to form a seal completely around the outside perimeter of the first circular disk, and the foldable permeable bag filter configured to enable liquid entering the first opening forming the inlet to permeate through the foldable permeable bag filter to a region between the foldable permeable bag filter and the soft foldable housing before exiting the second opening forming the outlet.

2. The liquid filter device as recited in claim 1 wherein the soft foldable housing and the foldable permeable bag filter are configured to expand into a cylindrical shape from a flat configuration when fluid is injected into the soft foldable housing and the foldable permeable bag filter via the first opening forming the inlet.

3. The liquid filter device as recited in claim 2 wherein the first circular disk has an outside surface and an inside surface, and wherein the soft foldable housing has a flat top surface and a flat bottom surface, wherein in the flat configuration a plane of the outside surface being parallel to a plane of at least one of the flat top surface and the flat bottom surface.

4. The liquid filter device as recited in claim 1 further comprising a removable ring bracket engaging with the first circular disk around a perimeter edge of the first circular disk, and engaging with the soft foldable housing completely around a top surface of the soft foldable housing to compress the foldable permeable bag filter between the first circular disk and the soft foldable housing to form a seal between the first disk, the foldable permeable bag filter, and the foldable soft housing around the perimeter edge of the first circular disk.

5. The liquid filter device as recited in claim 1 further comprising:
a multioutput pipe coupled to the second disk around the second opening for engaging with a hose, the multioutput pipe having a first outlet coupled, via a first tube extending through the second opening, with an opening in the foldable permeable bag filter to pass unfiltered fluid within the foldable permeable bag filter through the first outlet, and the multioutput pipe having a second outlet coupled, via a second tube disposed external to the soft foldable housing, with the region between the foldable permeable bag filter and the soft foldable housing to pass filtered fluid within the region between the foldable permeable bag filter and the soft foldable housing through the second outlet, the second tube surrounding the first tube to simultaneously pass unfiltered fluid and filtered fluid through the first outlet and second outlet of the multioutput pipe respectively.

6. The liquid filter device as recited in claim 1 wherein the open end of the foldable permeable bag filter terminates at the first circular disk.

7. A liquid filter device comprising:
a first circular flat disk having a first round opening forming an inlet and a second circular flat disk having a second round opening forming an outlet;
a flexible hose-shaped housing removably engaging with the first circular flat disk at one end of the flexible hose-shaped housing and engaging around a perimeter of the second circular flat disk at another end of the flexible hose-shaped housing; and
a flexible cylindrically shaped permeable bag filter completely encased by the hose-shaped housing, the permeable bag filter having a tapered end disposed between the first circular flat disk and the second circular flat disk, the permeable bag filter having an open end removably coupling with the first circular flat disk, the hose-shaped housing and the permeable bag filter to form a seal around a perimeter of the first circular flat disk, the permeable bag filter configured to enable liquid entering the first round opening forming the inlet to permeate through the permeable bag filter to a region between the permeable bag filter and the hose-shaped housing before exiting the second round opening forming the outlet.

8. The liquid filter device as recited in claim 7 wherein the flexible hose-shaped housing at one end forms a seal with the permeable bag filter completely around a perimeter edge of the first circular flat disk, and at its other end forms a seal completely around a perimeter edge of the second circular flat disk.

9. The liquid filter device as recited in claim 7 further comprising:
a removable multioutput pipe coupled to the second circular flat disk around the second round opening for engaging with a hose, the removable multioutput pipe having a first outlet coupled via a first tube extending through the second round opening with an opening at the tapered end of the permeable bag filter to pass unfiltered fluid within the permeable bag filter through the first outlet, and the removable multioutput pipe having a second outlet coupled via the second circular flat disk around the second round opening with the region between the permeable bag filter and the hose-shaped housing to pass filtered fluid within the region between the permeable bag filter and the hose-shaped housing through the second outlet, a second tube extending parallel to and surrounding the first tube to simultaneously pass unfiltered fluid and filtered fluid through the first outlet and second outlet of the multi-output pipe respectively.

\* \* \* \* \*